United States Patent
Kovaleski et al.

[11] Patent Number: 6,132,168
[45] Date of Patent: Oct. 17, 2000

[54] BALANCING A PRESSURE DROP ACROSS RING SEALS IN GAS TURBINE ENGINES

[75] Inventors: Stanley K. Kovaleski; Donald J. Kovaleski, both of South Windsor; Colin D. Craig, West Hartford, all of Conn.

[73] Assignee: United Technologies Corporation, Hartford, Conn.

[21] Appl. No.: 09/220,467

[22] Filed: Dec. 23, 1998

[51] Int. Cl.[7] .................................................. F01D 11/00
[52] U.S. Cl. .......................... 415/113; 415/107; 415/111; 415/168.4; 415/174.5
[58] Field of Search .................................... 415/111, 113, 415/112, 104, 107, 174.5, 168.2, 168.4; 277/365, 366, 399, 422, 928

[56] References Cited

U.S. PATENT DOCUMENTS

| | | | |
|---|---|---|---|
| 2,921,805 | 1/1960 | Shevchenko | 277/365 |
| 3,334,905 | 8/1967 | Horwitz et al. | 277/30 |
| 4,272,084 | 6/1981 | Martinson et al. | 277/30 |
| 5,217,233 | 6/1993 | Pecht et al. | 277/65 |

*Primary Examiner*—Edward K. Look
*Assistant Examiner*—Ninh Nguyen
*Attorney, Agent, or Firm*—McCormick, Paulding & Huber LLP

[57] ABSTRACT

A gas turbine engine includes a plurality of seal stages minimizing leakage of high pressure air from a high pressure cavity into a low pressure cavity. The plurality of seal stages includes an upstream seal stage, substantially adjacent to the high pressure cavity, and a downstream seal stage, substantially adjacent to the low pressure cavity. Each seal stage includes a seal plate and at least one seal. The downstream seal plate includes a plurality of bleeding holes for metering higher pressure air into the low pressure cavity, thereby balancing a pressure drop between the seal stages. Substantial equalization of the pressure drop among the seal stages reduces wear of the downstream seal and therefore, increases useful life an effectiveness thereof.

14 Claims, 4 Drawing Sheets

BALANCING A PRESSURE DROP ACROSS RING SEALS IN GAS TURBINE ENGINES

BACKGROUND OF THE INVENTION

1. Technical Field

The present invention relates to gas turbine engines and, more particularly, to the equalization of pressure acting on a plurality of ring seals therefor.

2. Background Art

A typical gas turbine engine includes a low compressor, a high compressor, a combustor, a high turbine, and a low turbine sequentially situated about a longitudinal axis. Air flows axially through the engine with the sections of the gas turbine engine enclosed in an engine case. As is well known in the art, the air enters the low compressor at a substantially ambient temperature and pressure and is compressed by the low and high compressor sections, respectively, to elevate its temperature and pressure. The compressed air is then mixed with fuel, ignited and burned in the combustor. The hot products of combustion emerging from the combustor are expanded in the high and low turbines, respectively, thereby rotating the turbine and driving the compressor.

Certain sections of the gas turbine engine are subjected to extremely harsh environment, characterized by high temperatures and pressures. Some of the essential engine components are sensitive to the harsh environment thereof and must be shielded from the high temperature and pressure of the working fluid. These components are typically vented by ambient or cooling bleed-off air or have cooling oil flowing therethrough. In order to maintain cool air in the cavities housing these components, the cavities must be shielded from the high temperature and pressure air that attempts to flow into the lower temperature and pressure air cavities housing these components. Typically, a plurality of seals is positioned to prevent high temperature and pressure air from flowing downstream into the areas with lower temperature and pressure air.

The existing seals are typically manufactured from carbon and are held in place by seal plates. Certain areas of the gas turbine engine require multiple seals, referred to as stages of seals. These seal stages serve as barriers to the high temperature and pressure air that is trying to seep past the seals and into the cavities with lower pressure and temperature. Generally, the greatest pressure drop occurs in the seal stage that is farthest from the high temperature and pressure air area and the lowest pressure drop occurs in the seal stage that is nearest to the high temperature and pressure air area. The stage that experiences the greatest pressure drop also experiences the greatest amount of seal wear and thus, the quickest loss of effectiveness. Once the seal wears out in one of the stages, the seal located in the adjacent stage experiences the most wear and loses its effectiveness at an accelerated rate. This "domino effect" results in relatively fast deterioration of all seal stages and, subsequently, in a loss of the barrier between the higher temperature and pressure air area and the lower temperature and pressure air area.

In certain critical portions of the gas turbine engines, relatively rapid deterioration of the seals is detrimental to continued normal operation of the gas turbine engine. If seals wear out too quickly, the gas turbine engine has to be removed from the plane for repairs. Removal of the gas turbine engine from the plane for unscheduled service results in additional expense and inconvenience to the plane owner. Therefore, it is desirable to prolong the life and effectiveness of the seals in gas turbine engines.

SUMMARY OF THE INVENTION

It is an object of the present invention to increase the life and effectiveness of seals in gas turbine engines.

It is another object of the present invention to balance a pressure drop among seal stages.

According to the present invention, a downstream seal plate for retaining at least one downstream seal in a downstream seal stage of a plurality of seal stages in a gas turbine engine includes a plurality of bleeding holes for metering a portion of higher pressure air therethrough. Allowing a portion of high pressure air to escape through the bleeding holes formed in the downstream seal plate substantially balances pressure drop between the downstream seal stage and an upstream seal stage. Balancing the pressure drop between the seal stages significantly reduces wear of the downstream seal, thereby increasing useful life and effectiveness thereof.

According to one embodiment of the present invention, a midstream seal plate of a midstream seal stage in the plurality of seal stages also includes a plurality of bleeding holes, thereby balancing pressure drop among the upstream, midstream, and downstream seal stages.

One advantage of the present invention is that the gas turbine engine does not need to be prematurely removed from the plane for an unscheduled service. Rather, the increase in useful life of the downstream seal allows the seal to remain effective until scheduled maintenance.

The foregoing and other advantages of the present invention become more apparent in light of the following detail description of the exemplary embodiments thereof, as illustrated in the accompanying drawings.

DETAILED DESCRIPTION OF THE INVENTION

Figure 1:
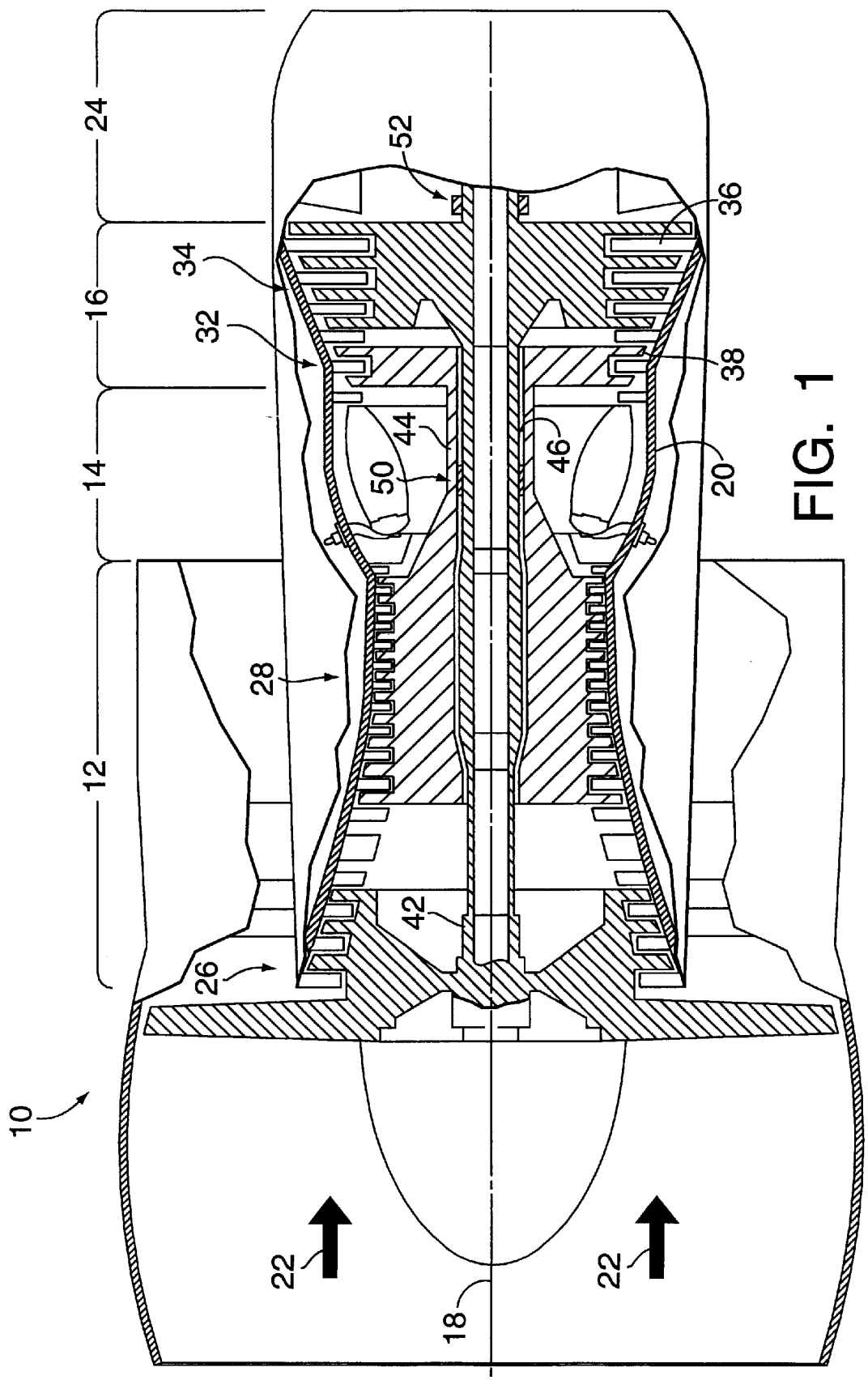
FIG. 1 is a simplified, partially broken away representation of a gas turbine engine.

Referring to FIG. 1, a gas turbine engine 10 includes a compressor 12, a combustor 14, and a turbine 16 situated about a longitudinal axis 18. A gas turbine engine case 20 encloses sections 12, 14, 16 of the gas turbine engine 10. Air 22 flows through the sections 12, 14, 16 of the gas turbine engine 10 and is exhausted through an aft portion 24 of the gas turbine engine 10. The compressor 12 comprises a low compressor section 26 and a high compressor section 28 and the turbine 16 comprises a high turbine section 32 and a low turbine section 34. The compressor 12 and the turbine 16 include alternating rows of stationary vanes 36 and rotating blades 38. The stationary vanes 36 are mounted onto the engine case 20. The rotating blades 38 of the low compressor 26 and low turbine 34 are secured onto a rotating low rotor 42. The rotating blades 38 of the high compressor 28 and high turbine 32 are secured onto a rotating high rotor 44, which is disposed radially outward of the rotating low rotor 42. An axial intershaft clearance 46 is defined between the rotating low rotor 42 and the rotating high rotor 44. An intershaft plurality of seal stages 50 is disposed within the intershaft clearance 46 in the combustor section 14 of the gas turbine engine 10. A single shaft plurality of seal stages 52 is disposed about the low rotor 42 in the aft portion 24 of the gas turbine engine 10.

Figure 2:
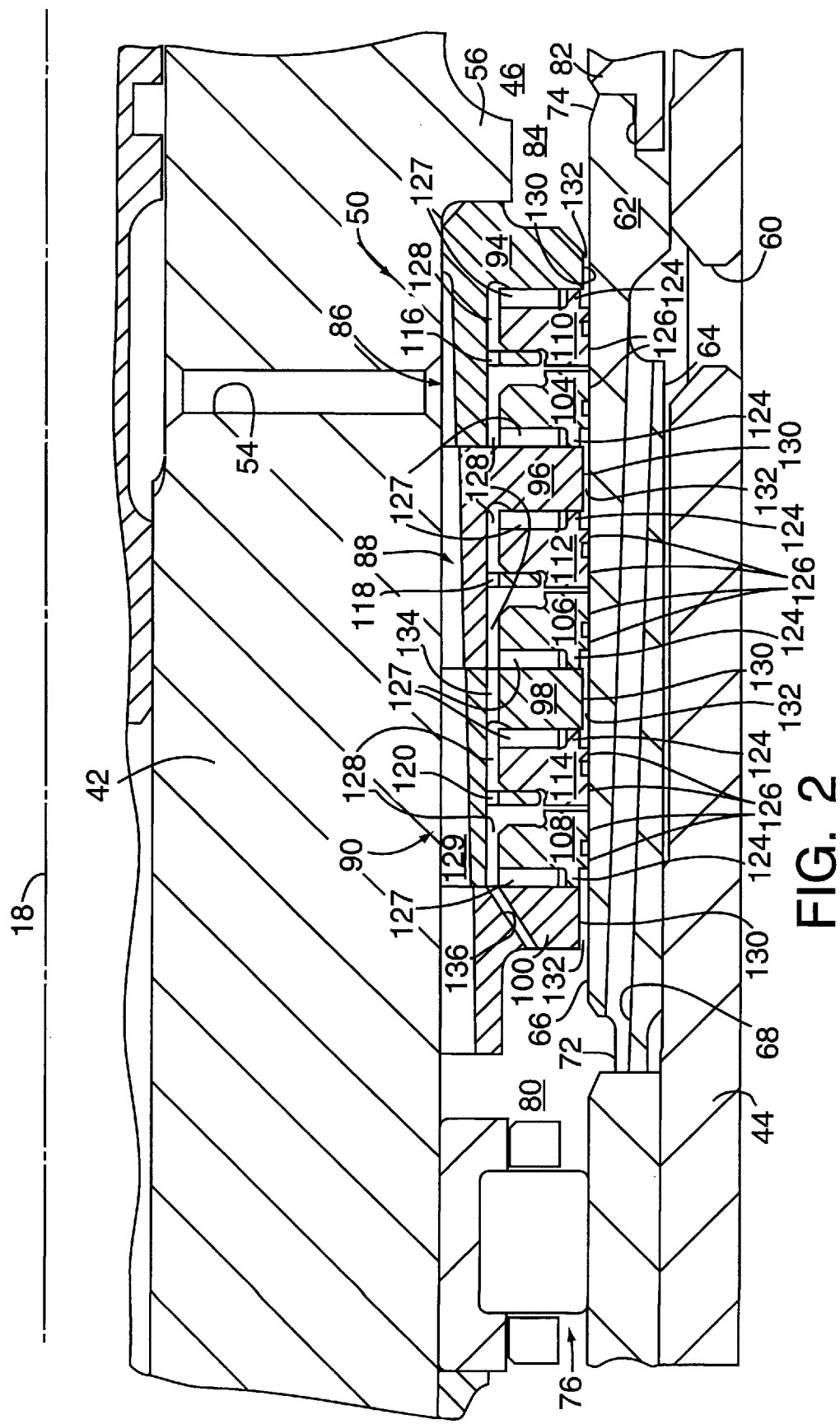
FIG. 2 is an enlarged, fragmentary cross-sectional view of a plurality of intershaft seal stages disposed between a low rotor and a high rotor of the gas turbine engine of FIG. 1.

Referring to FIG. 2, the low rotor 42 includes a low rotor oil hole 54 passing therethrough and a low rotor shoulder 56 protruding radially outward. The high rotor 44 includes a high rotor oil hole 60 passing therethrough. A seal runner 62 is secured to the high rotor 44 and includes a rotor side surface 64 and a runner clearance surface 66 with a plurality of runner cooling holes 68 passing therethrough. The rotor side surface 64 of the seal runner 62 is substantially adjacent to the high rotor 44 and the runner clearance surface 66 interfaces with the intershaft plurality of seal stages 50. The seal runner 62 also includes a downstream side 72 and an upstream side 74. A bearing 76 is disposed substantially adjacent to the downstream side 72 of the seal runner 62 and, in cooperation with the downstream side 72 of the seal runner 62 and the seal stages 50, defines a low pressure air compartment 80. A spacer 82 is substantially adjacent to the upstream side 74 of the seal runner 62 and, in cooperation with the seal runner 62, low rotor 42 and the seal stages 50, defines a high pressure air compartment 84.

The intershaft plurality of seal stages 50, sandwiched in the intershaft clearance 46 between the low rotor 42 and the high rotor 44, includes an upstream seal stage 86, a midstream seal stage 88, and a downstream seal stage 90 spaced apart by an upstream seal plate 94, a first mid-stream seal plate 96, a second mid-stream seal plate 98, and a downstream seal plate 100, with the upstream seal plate 94 resting against the low rotor shoulder 56. Each seal stage 86, 88, 90 includes a respective oil side seal 104, 106, 108 and an air side seal 110, 112, 114 separated by an axial wave spring 116, 118, 120. Each seal 104, 106, 108, 110, 112, 114 has a nose portion 124 that comes into contact with the respective adjacent seal plate 94, 96, 98, 100 and sealing surfaces 126 that interface with the runner clearance surface 66 of the seal runner 62. Each seal 104, 106, 108, 110, 112, 114 also includes air pockets 127 adjacent to the respective seal plate 94, 96, 98, 100 and forms an inner air cavity 128 with the respective seal plate 94, 96, 98, 100.

Each seal plate 92, 96, 98, 100 is secured to the low rotor 42 and forms a circumferential ring having a substantially L-shaped cross section and an oil passage 129. Each seal plate 94, 96, 98, 100 includes a plate clearance surface 130 that, in cooperation with the runner clearance surface 66, defines an outer air cavity 132 to provide a running clearance between the seal plates 92, 96, 98, 100, rotating with the low rotor 42, and the seal runner 62, rotating with the high rotor 44.

The second mid-stream seal plate 98 and the downstream seal plate 100 include mid-stream and downstream bleeding holes 134, 136, respectively. The mid-stream bleeding holes 134 are formed substantially parallel to the longitudinal axis 18 of the gas turbine engine 10 to prevent interference of the seals 106, 114 with the bleeding holes 134. The downstream bleeding holes 136 are angled with respect to the longitudinal axis 18 of the gas turbine engine 10 to prevent oil and debris from the low pressure air compartment 80 from entering the seal stages 50 through the bleeding holes 136.

Figure 3:
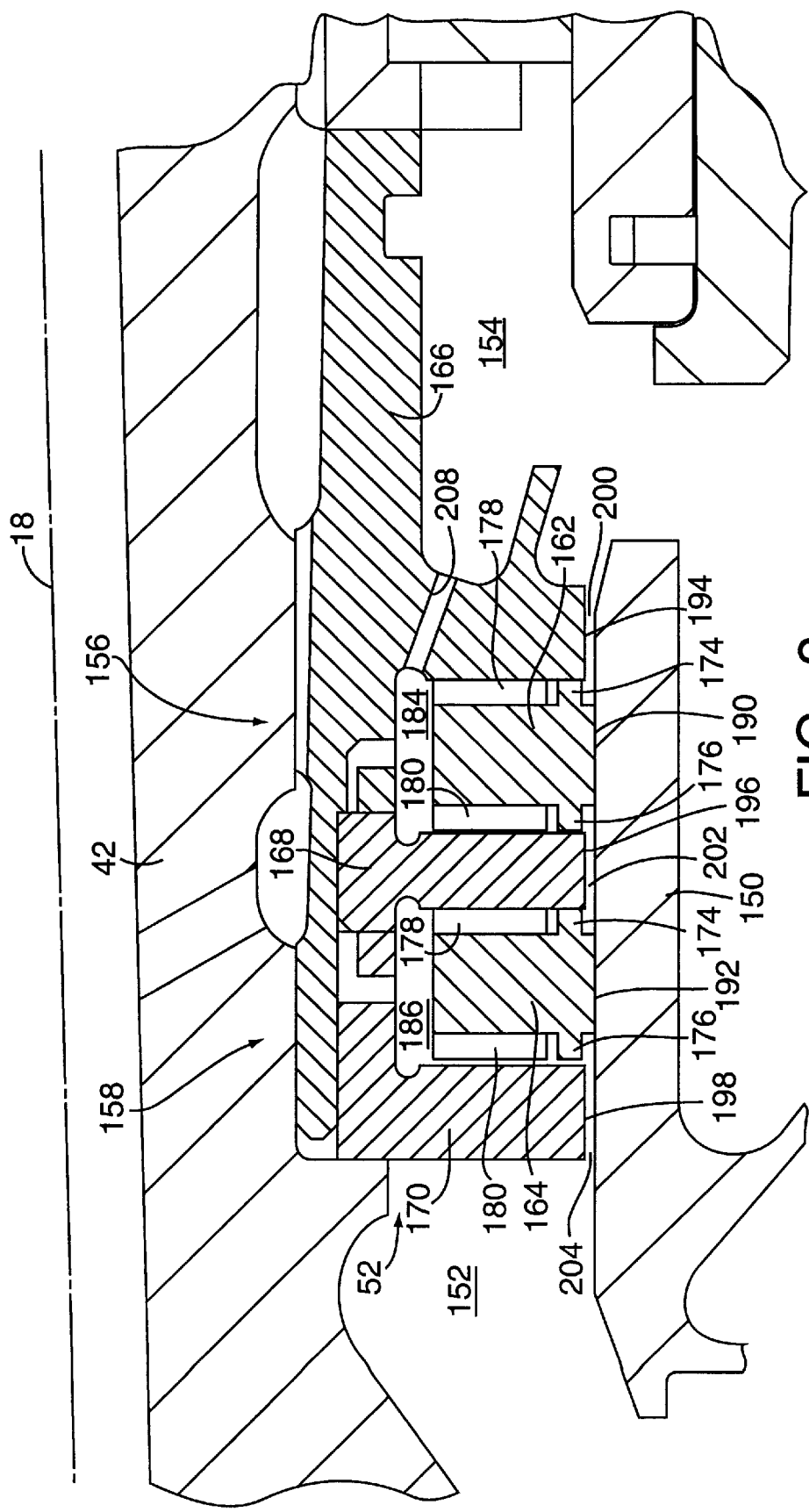
FIG. 3 is an enlarged, fragmentary cross-sectional view of a plurality of single shaft seal stages disposed about the low rotor of the gas turbine engine of FIG. 1.

Referring to FIG. 3, the single shaft plurality of seal stages 52 is secured to the low rotor 42 and interfaces with a stationary runner 150. A high pressure air compartment 152 is disposed on one side of the single shaft plurality of seal stages 52 and a low pressure air compartment 154 is disposed downstream on the other side of the single shaft seal stages 52. The single shaft plurality of seal stages 52 includes a downstream seal stage 156 and an upstream seal stage 158. Each seal stage 156, 158 includes a downstream seal 162 and an upstream seal 164, respectively, bound by a downstream seal plate 166, a midstream seal plate 168, and an upstream seal plate 170.

Each seal 162, 164 includes a first and second nose portion 174, 176 with first and second pluralities of air pockets 178, 180 formed on each side thereof. Each seal 162, 164 forms an inner air cavity 184, 186 between seal 162, 164 and the seal plates 166, 168, 170, respectively. The seals 162, 164 also form interfaces between an outer seal surface 190, 192 and the stationary runner 150. Each seal plate 166, 168, 170 includes a seal plate clearance surface 194, 196, 198 to define, in cooperation with the stationary runner 150, an outer air cavity 200, 202, 204. The downstream seal plate 166 includes a plurality of downstream bleeding holes 208 formed therein.

As the gas turbine engine 10 begins to operate, the pressure of the air 22 flowing sequentially through the low and high compressor 26, 28 is increased, thereby effecting compression of the incoming airflow 22, as best seen in FIG. 1. The compressed air is mixed with fuel, ignited and burned in the combustor 14. The hot products of combustion emerge from the combustor 14 and enter the high turbine 32 and then the low turbine 34 at extremely high temperature and pressure. The turbine blades 38 expand the hot air, generating thrust and extracting energy to drive the compressor 12. The high compressor 28 and the high turbine 32, driven by the high rotor 44, rotate at substantially higher speeds than the low compressor 26 and low turbine 34, driven by the low rotor 42. Thus, the high rotor 44 and the low rotor 42 rotate at different speeds. The intershaft seal stages 50, secured to the low rotor 42, rotate in unison with the low rotor 42, whereas the seal runner 62, secured to the high rotor 44, rotates in unison with the high rotor 44, as best seen in FIG. 2.

As the air is forced through the gas turbine engine 10 with its temperature and pressure gradually increasing, the air tends to escape the airpath and move into downstream areas having lower temperature and pressure. In the intershaft clearance 46, the air from the higher pressure and temperature compartment 84 attempts to flow downstream into the lower pressure and temperature compartment 80.

During operation of the gas turbine engine 10, cooling oil also flows through portions of the gas turbine engine 10 to cool certain portions thereof, such as bearings 76 and the bearing compartment 80, shown in FIG. 2. Referring to FIG. 2, oil, aided by the centrifugal forces, flows radially outward through the low rotor oil hole 54 and through the oil passage 129, formed between the low rotor 42 and the seal stages 50, into the low pressure air compartment 80 to cool and lubricate the bearing 76. The oil then flows through the seal runner cooling holes 68 and the high rotor oil holes 60.

Figure 4:
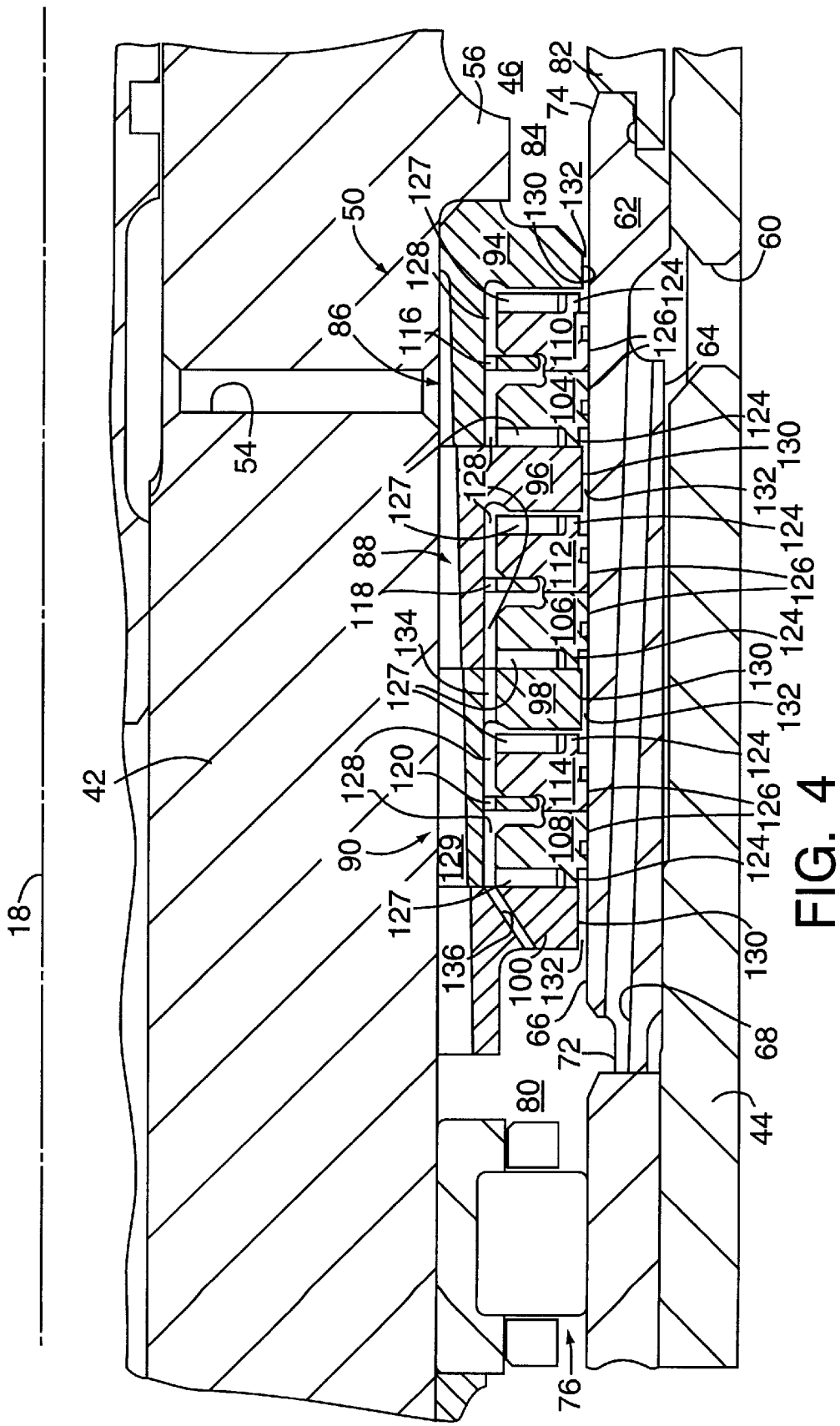
FIG. 4 is an enlarged, cross-sectional view of the plurality of intershaft seal stages of FIG. 2 loaded by the high temperature and pressure air.

Referring to FIG. 4, the high temperature and pressure air disposed in the high pressure air compartment 84 attempts to move past the intershaft seal stages 50 downstream into the low pressure compartment 80. As the high pressure air flows past the upstream seal plate 94 through the outer air cavity 132, the air applies force onto the air seal 110 of the upstream stage 86. The air side seal 110 of the upstream stage 86 in turn applies force onto the wave spring 116 and presses against the oil side seal 104 of the upstream stage 86. As the nose portion 124 of the air side seal 110 is forced by the air away from the upstream seal plate 94, the air seeps through the air pockets 127 of the air side seal 110 into the inner air cavity 128 formed with the upstream seal plate 94 and into the air pockets 127 of the oil side seal 104. The high pressure air further seeps between the nose portion 124 of the oil side seal 104 and the first mid-stream seal plate 96, forming a thin air film therebetween, into the outer air cavity 132 that is formed between the first mid-stream plate 96 and the seal runner 62 to act on the midstream air side seal 112. The high pressure air also seeps into the outer air cavity 132 of the seal plate 96 through the interface between the sealing surfaces 126 of seals 110, 104 and the runner clearance surface 66.

Similarly to the air side seal 110 of the upstream seal stage 86, the air side seal 112 of the mid-stream stage 88 allows the high pressure air to pass between the nose portion 124 and the seal plate 96 into the inner air cavities 128 of the mid-stream stage 88. The air then partially bleeds through the mid-stream bleeding holes 134 into the inner air cavity 128 of the downstream stage 90, thereby bypassing the downstream air side seal 114. Also, the air partially passes through the air pockets 127 and the nose portion 124 of the midstream oil side seal 106 into the midstream outer air cavity 132 formed with the seal plate 98, thereby acting on the downstream air side seal 114.

The air acting on the downstream air side seal 114 seeps therethrough into the downstream inner air cavity 128. From the downstream inner cavity 128, a portion of the higher pressure air bleeds through the downstream bleeding holes 136 into the low pressure air compartment 80 while a portion of the air escapes through the interface between the oil side seal 108 and the downstream seal plate 100, as well as through the interface between the sealing surfaces 126 of the seal 108 and the seal runner 62.

As the air travels downstream through the intershaft seal stages 50, the oil side seals 104, 106, 108 experience wear from friction forces between the oil side seals 104, 106, 108 and the adjacent seal plates 96, 98, 100, respectively. However, the rate of wear on the oil side seals 104, 106, 108 is substantially equal among the oil side seals 104, 106, 108. Since a portion of the high pressure air is bled through the bleeding holes 134, 136 in the mid-stream and downstream seal plates 98, 100, the pressure drop across the intershaft seal stages 50 is substantially equalized. Preventing the greatest pressure drop in the downstream seal stage 90 and distributing the pressure drop among the seal stages 86, 88, 90 reduces wear of the oil side seal 108 of the most downstream seal stage 90. Lengthening the life of the downstream oil side seal 108 is critical in the gas turbine engine industry because potential replacement of the seal can coincide with regularly scheduled gas turbine engine service and eliminates the need for removing the gas turbine engine 10 from the plane for premature or unscheduled repairs.

During gas turbine engine operation, the single shaft seal stages 52 controls the seepage of high pressure and temperature air from the high pressure air compartment 152 into the low pressure air compartment 154, as best seen in FIG. 3. The high-pressure air in the high pressure compartment 152 applies force onto the upstream seal 164 forcing the upstream seal 164 against the midstream seal plate 168. The high pressure air seeps around the second nose portion 176 and air pockets 180 of the upstream seal 164 into the inner air cavity 186. The air then bleeds around the first nose portion 174 and air pockets 178 of the seal 164 into the outer air pocket 202, defined by the midstream seal plate 168. The high pressure air from the high pressure compartment 152 also seeps through the interface between the outer seal surface 192 and the stationary runner 150 and to the outer air cavity 202. The air in the outer air cavity 202 acts upon the downstream seal 162, forcing it against the downstream seal plate 166. A portion of the higher pressure air from the outer air cavity 202 seeps through the interface between the outer seal surface 190 and the stationary runner 150 into the lower pressure air cavity 154. A portion of the air from the outer air cavity 202 bypasses the second nose portion 176 and air pockets 180 of the downstream seal 162 into the inner air cavity 184 of the downstream seal stage 156. The bleeding holes 208 allow a portion of the higher pressure air to escape into the lower pressure compartment 154 with the remaining air passing through the first nose portion 174 and air pockets 178 of the downstream seal 162.

Bleeding a portion of the higher pressure air from the downstream seal stage 156 into the lower pressure compartment 154 substantially equalizes the pressure drop between the upstream seal stage 158 and the downstream seal stage 156. Substantially equal pressure drop between the seal stages 156, 158 allows substantially equal wear on seals 162, 164 thereby lengthening the life and efficiency of the seal stage 156.

In the preferred embodiment of the present invention, there are eight (8) downstream bleeding holes 136 having a diameter equaling approximately thirty five thousands of an inch (0.35") and there are two (2) midstream bleeding holes 134 having a diameter equaling approximately thirty eight thousands of an inch (0.38") substantially equally spaced around the circumference of the seal plates 100, 98, respectively. There are three (3) bleeding holes 208 having a diameter approximately equaling to thirty eight thousands of an inch (0.38"). The bleeding holes 134, 136, 208 are formed and sized to balance any pressure drop among seal stages 86, 88, 90 and 156, 158. Sizing of the bleeding holes 134, 136 takes into consideration rotational effects of the air passing through the bleeding holes. The downstream bleeding holes 136, 208 are angled in the preferred embodiment of the present invention to take advantage of centrifugal forces to remove oil and debris therefrom. However, the downstream bleeding holes 136 do not need to be angled with respect to the longitudinal axis 18 of the gas turbine engine 10. The midstream bleeding holes 134 are not angled in the preferred embodiment of the present invention to accommodate specific geometrical configuration of the adjacent seals 106, 114, thereby preventing periodic blockage of the bleeding holes 134.

While the present invention has been illustrated and described with respect to a particular embodiment thereof, it should be appreciated by those of ordinary skill in the art, that various modifications to this invention may be made without departing from the spirit and scope of the present invention.

We claim:

1. A seal plate for retaining a seal in a predetermined location in a gas turbine engine, said seal plate comprising:
    a seal plate body shaped to cooperate with said seal, said seal plate body having a plurality of bleeding holes to allow air from a higher-pressure air area to pass therethrough to a lower-pressure air area.

2. The seal plate according to claim 1 wherein said bleeding holes of said seal plate are substantially equally spaced around circumference of said seal plate.

3. The seal plate according to claim 1 wherein said bleeding holes are angled with respect to a center axis of said gas turbine engine to prevent oil and debris from entering said bleeding holes.

4. A gas turbine engine having a first cavity with a higher pressure air and a second cavity with a lower pressure air, said gas turbine engine comprising:

a first seal stage disposed substantially adjacent to said first cavity for minimizing leakage of higher pressure air from said first cavity, said first seal stage including at least one first seal and a first seal plate retaining said first seal in a first predetermined location; and a second seal stage disposed substantially adjacent to and downstream from said first seal stage for minimizing leakage of higher pressure air from said first seal stage, said second seal stage comprising at least one second seal and a second seal plate retaining said second seal in a second predetermined location, said second seal plate having a second seal plate plurality of bleeding holes for allowing a portion of higher pressure air to pass therethrough.

5. The gas turbine engine according to claim 4 further comprising:

a third seal stage disposed substantially adjacent to and downstream from said second seal stage, said third seal stage having at least one third seal and at least one third seal plate, said third seal plate having a third seal plate plurality of bleeding holes for allowing higher pressure air to escape from said second seal stage and to seep into said second cavity.

6. The gas turbine engine according to claim 5 wherein said third seal stage includes two third seals separated by a spring.

7. The gas turbine engine according to claim 5 wherein said third seal stage includes a single third seal.

8. The gas turbine engine according to claim 4 wherein each said seal stage includes one seal.

9. The gas turbine engine according to claim 4 wherein each said seal stage includes two seals separated by a spring.

10. The gas turbine engine according to claim 4 wherein said bleeding holes of said second seal plate are substantially equally spaced around circumference of said second seal plate.

11. The gas turbine engine according to claim 4 wherein said bleeding holes are angled with respect to a center axis to prevent oil and debris from entering said bleeding holes.

12. A gas turbine engine having a low compressor, a high compressor, a combustor, a high turbine and a low turbine situated along a longitudinal axis, said high compressor and said high turbine including a plurality of rows of rotating blades attached to a high rotor and said low compressor and said low turbine including a plurality of rows of rotating blades attached to a low rotor, said high rotor being disposed radially outward of said low rotor, said gas turbine engine comprising:

a plurality of seal stages disposed between said low rotor and said high rotor to minimize leakage of higher pressure air from a first cavity with higher pressure air downstream to a second cavity with lower pressure air, said plurality of seal stages having a downstream seal stage substantially adjacent to said second cavity and an upstream seal stage substantially adjacent to said first cavity, said downstream seal stage having a downstream seal plate having a plurality of downstream bleeding holes formed therein to substantially balance pressure drop between said seal stages.

13. The gas turbine engine according to claim 12 wherein said plurality of seal stages further includes a midstream seal stage disposed between said downstream seal stage and said upstream seal stage, said midstream seal stage having a midstream seal plate having a plurality of midstream bleeding holes formed therein to further balance pressure drop between said plurality of seal stages.

14. A gas turbine engine having a compressor, a combustor, and a turbine situated along a longitudinal axis, said compressor and said turbine including a plurality of rows of rotating blades attached to a rotor, said gas turbine engine comprising:

a plurality of seal stages disposed about said rotor to minimize leakage of higher pressure air from a first cavity with higher pressure air downstream to a second cavity with lower pressure air, said plurality of seal stages having a downstream seal stage substantially adjacent to said second cavity and an upstream seal stage substantially adjacent to said first cavity, said downstream seal stage having a downstream seal plate having a plurality of downstream bleeding holes formed therein for metering a portion of higher pressure air therethrough to substantially balance pressure drop between said plurality of seal stages.

* * * * *